3,453,287
SUCCINIMIDO-[3,4-b]INDAN-8-ONES
AND PROCESS
Ernest E. Campaigne, 1240 E. Wylie St., Bloomington, Ind. 47401, and Richard F. Weddleton, Scotia, N.Y. (2223 Van Rensselaer Drive, Schenectady, N.Y. 12309)
No Drawing. Filed Feb. 9, 1966, Ser. No. 526,047
Int. Cl. A61k 27/00; C07d 27/10
U.S. Cl. 260—326.5  6 Claims

ABSTRACT OF THE DISCLOSURE 1-unsubstituted 3a-substituted succinimido[3,4-b]indan-8-one and the metal salts thereof. The free bases are prepared by treating a 2-carboxamido- or 2-cyano-3-R-1-indenone with a cyanide in an acidic alcoholic medium, hydrolyzing the resulting 2-carboxamido- or 2-cyano-3-cyano-3-R-1-indanone to get the corresponding 2,3-dicarboxamido-3-R-1-indanone and ring closing the latter compound. The resulting compounds have anti-convulsant, muscle-relaxant, anorexic and hypotensive activities. They may also be brominated to the corresponding N-bromo derivatives which are useful in the bromination of olefins.

This invention relates to the provision of a new class of organic compounds for use as chemical intermediates and as the active component of pharmaceutical compositions. It relates further to a process by which the new compounds of this invention can be prepared.

It is an object of the present invention to provide a new class of 1-unsubstituted 3a-substituted succinimido-[3,4-b]-indan-8-ones and metal salts thereof which can be used as intermediates and reagents in the preparation of other organic compounds and as therapeutically active components of pharmaceutical compositions. It is a further object of the present invention to provide a process by which said compounds can be prepared. Other objects will be apparent from a reading of the ensuing description of the present invention.

In accordance with the present invention, the foregoing objects are accomplished by the provision of a class of compounds of the formula:

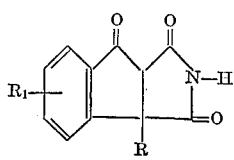

and the salts, especially the pharmaceutically acceptable salts thereof. In Formula I the symbol R is intended to means lower alkyl of 1–8 carbons or phenyl; and the symbol $R_1$ is intended to represent hydrogen, chloro, bromo, iodo, fluoro, trifluoromethyl, lower alkyl, lower alkoxy, lower alkanoyl or lower alkanoyloxy. The salts of the present invention include the pharmaceutically acceptable sodium, potassium, calcium, magnesium, aluminum salts and the like.

The term "lower alkyl" as used herein means both cyclic and straight- and branched-chain saturated hydrocarbon radicals having from one to eight carbons, such as methyl, ethyl, propyl, isopropyl, butyl, isobutyl, t-butyl, amyl, hexyl, cyclohexyl, 2-ethylcyclohexyl and the like.

Similarly, where the term "lower" is used as part of the description of another radical, e.g. "lower alkoxy," it limits the alkyl portion of such radical to such groups as were previously described in connection with "lower alkyl."

Compounds within the scope of Formula I are useful as intermediates and reagents in the synthesis of other organic chemical compounds and as active components in pharmaceutical formulations. The utility of the compounds of Formula I as chemical reagents is derived primarily from the ability of the compounds to be N-brominated by adding bromine to a solution of the compound in ice-cold NaOH. The resulting N-bromo derivative having the characteristics of an N-bromo succinimide is useful in the bromination of olefins by known methods. Thus, by the method of Ziegler et al., Ann. 551, 80 (1942), the unsaturated compound to be brominated is heated with the N-bromo derivative in carbon tetrachloride. As the bromination proceeds, the brominating agent separates and can be filtered off while the brominated olefin derivative can be recovered by fractional distillation.

Compounds of Formula I can be used as the active component in pharmaceutical compositions since the compounds influence the activity of the central nervous system by the exertion of anti-convulsant, muscle-relaxant, anorexic and hypotensive activities. They also act as analgesics. These activities can be demonstrated by standard test procedures. For example, anorexic activity is demonstrated by the mouse anorexia assay. In this test, groups of five mice in each group, not fed for the preceding sixteen to seventeen hours, are placed in a cage, given the drug to be tested and, after another thirty minutes, are given a weighed amount of food. One hour after presenting the food, the food dish is removed and weighed. Control mice, i.e. dosed with water, eat an average of 6.2 grams per group of five mice. Significant anorexic activity is exhibited when a group of five treated mice eat less than two grams in an hour when the preferred compound of the present invention, i.e. the compound of Formula I wherein R is isopropyl and $R_1$ is hydrogen, reduced the food intake to amounts in the range of 0–2 grams at oral dosages of 25, 50 and 100 mgm./kg.

The compounds of this invention may be administered as free bases or in the form of their non-toxic salts. For therapeutic administration, these compounds may be admixed with pharmaceutical excipients and used, for instance, in the form of tablets, dragees, capsules, suppositories, injectable liquids, liquids to be administered in drops, emulsions, suspensions, sirups, chocolate, candy, chewing gum, and the like. Such compositions and preparation should contain at least 0.1% of the active ingredient. The percentage in the compositions and preparations may, of course, be varied and may conveniently be between about 2% and about 60% or more of the weight of the unit. The amount of active ingredient in such therapeutically useful compositions or preparations is such that a suitable dosage will be obtained. Preferred compositions or preparations according to the present invention may be prepared in such a manner that a dosage unit form contains between about 10 milligrams and about 250 milligrams of the novel compounds.

The compounds of Formula I can be prepared from known materials by the following series of reactions:

(1) Malononitrile (II) and an aromatic ketone (III) are reacted by the method of Mowry (J.A.C.S., 67, 1050 [1945]) to give an ylidenemalononitrile (IV) as follows (Equation A):

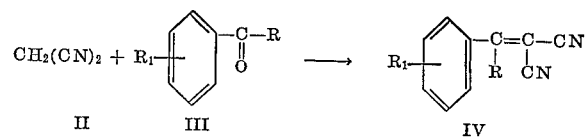

Equation A (2) The ylidenemalononitrile (IV) is heated with a strong acid such as concentrated sulfuric acid at a temperature of about 45–60° C. (method of Campaigne et al., J. Org. Chem., 26, 4703, 1961) to give the indenones of Formula V as follows (Equation B):

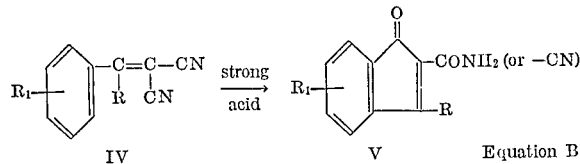

Equation B (3) Cyanide addition to compounds of Formula V by treatment with excess aqueous alkali cyanide (optionally in an alcoholic solvent) and dilute sulfuric acid in the cold (method of Koelsch, J. Org. Chem., 25, 2088, 1960), gives the 3-cyano-3-R-indanones of Formula VI as follows (Equation C):

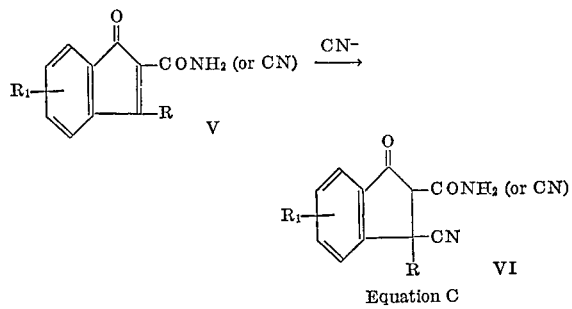

Equation C (4) Treatment of compound VI with a concentrated strong acid such as technical sulfuric acid (93.2%) at a temperature up to about 40° C., gives the 2,3-dicarboxamido-1-indanone of Formula VII as follows (Equation D):

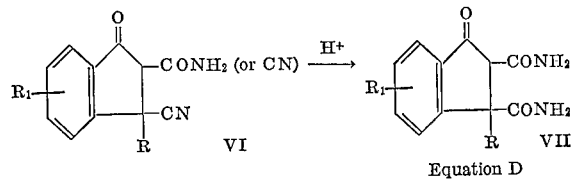

Equation D (5) Compounds of Formula I are obtained from compounds of Formula VII by ring closure with, for example, an organic solvent and a strong acid (e.g., diethylene glycol or ethylene glycol and technical grade sulfuric acid) at a temperature of about 120–130° C., as shown in the following (Equation E):

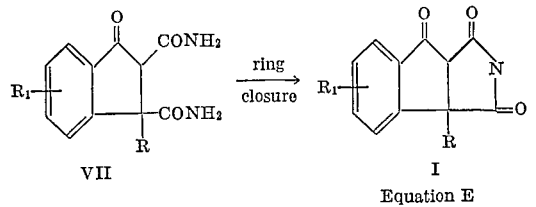

Equation E

In the foregoing formulae and equations, R and $R_1$ are as defined above. It will be noted that the 2-position of indenones of Formula V and the indanones of Formula VI are indicated as being alternatively substituted by either a carboxamido or a cyano group. This is because the cyano group of the precursor is not hydrolyzed when the R radical of the precursor is a "bulky" group, e.g. t-butyl, but is hydrated when the R radical is a small group such as methyl or ethyl. In either event, however, the hydrolysate of VI, i.e. compound VII, will have a carboxamido group in the 2-position of the indanone nucleus, as Equation D indicates.

Illustrative of the aromatic ketones (III) which can be converted by the foregoing reactions, are the following: benzophenone, p-chlorobenzophenone, p-methylbenzophenone, p-trifluoromethylacetophenone, p-ethoxypropiophenone, p-acetylacetophenone, p-acetoxypropiophenone, butyrophenone, isobutyrophenone, cyclohexylphenylketone, hexylphenylketone, and the like.

The following examples are presented to further illustrate the present invention.

Example 1.—2-carboxamido-3-cyano-3-ethyl-1-indanone

A mixture of 10 g. (0.05 mole) of 2-carboxamido-3-ethyl-1-indenone, 4 g. (0.082 mole) of sodium cyanide, 14 ml. of t-butyl alcohol and 40 ml. of water was heated on a steam bath until a homogeneous solution was obtained (30 minutes) and poured into a mixture of 500 g. of ice and 15 ml. of 20% sulfuric acid, yielding a yellow oil. The oil was extracted with chloroform; the chloroform extract was washed with water and bicarbonate. The bicarbonate wash was acidified, extracted with chloroform and evaporated, yielding the product as an oil.

Example 2.—2-carboxamido-3-cyano-3-isopropyl-1-indanone

A mixture of 20.0 g. (0.093 mole) of 2-carboxamido-3-isopropyl-1-indenone, 80 ml. of water, 48 ml. of t-butyl alcohol and 8.0 g. (0.16 mole) of sodium cyanide was heated on a steam bath with stirring until a homogeneous solution was obtained, then left at room temperature for three hours and poured into a mixture of 600 g. of ice and 200 ml. of 20% sulfuric acid, yielding an oil. The oil was extracted with chloroform; the chloroform layer washed with water, dried and evaporated, yielding an oil which solidified upon standing, yielding 17.5 g. (78%) of a cream-colored solid, M.P. 100–110°. Three recrystallizations from ethyl acetate-hexane afforded colorless prisms, M.P. 136–137°.

Example 3.—2,3-dicyano-3-t-butyl-1-indanone

A mixture of 5.0 g. (24 moles) of 2-cyano-3-t-butyl-1-indenone, 20 ml. of water, 2.0 g. of sodium cyanide (41 mmoles) and 2.0 ml. of t-butyl alcohol was warmed on a steam bath until a clear red solution resulted (10 minutes). The solution was added with stirring to a mixture of 50 ml. of 20% sulfuric acid and 100 g. of ice, yielding 5.6 g. (100%) of a pink precipitate, M.P. 133–137°. Two recrystallizations from benzene-petroleum ether (3:1) gave slightly pink plates, M.P. 140–142°.

Example 4.—2-carboxamido-3-cyano-3-phenyl-1-indanone

A mixture of 50.0 g. (0.2 mole) of 2-carboxamido-3-phenyl-1-indenone, 200 ml. of water, 20 g. of sodium cyanide (0.41 mole) and 20 ml. of ethanol was warmed on a steam bath until a clear solution resulted (12 minutes), the solution was cooled and acidified (by pouring into a mixture of 500 ml. of 20% sulfuric acid and 1 kg. of ice with stirring), yielding 54.5 g. (98%) of a yellowish precipitate, M.P. 164–167° dec. Two recrystallizations from ethanol gave pink prisms, M.P. 171–173°.

Example 5.—2,3-dicarboxamido-3-ethyl-1-indanone

The oil of Example 1 was added to 100 ml. of technical (93.2%) sulfuric acid, the mixture heated on a steam bath until a homogeneous solution was obtained (20 minutes) and then left at room temperature for 90 minutes. The solution was poured onto 1 l. of ice and extracted with chloroform; the chloroform extract was washed with water, dried and evaporated, yielding 5.4 g. of a yellow solid, M.P. 87–102°. A small amount of this mixture was recrystallized from 95% ethanol, affording the product as yellowish prisms, M.P. 180–181.5°.

Example 6.—3a-ethylsuccinimido[3,4-b]indan-8-one

A mixture of 5.0 g. of the product of Example 5, 50 ml. of diethylene glycol and 1 ml. of concentrated sulfuric acid was heated at 120–130° for 30 minutes and poured into 1 l. of ice, yielding 2.1 g. (42%) of a slightly tan precipitate, M.P. 178–179°. Two recrystallizations from 95% ethanol gave prisms, M.P. 181–182°. The aqueous filtrate was extracted with chloroform, dried and evaporated, yielding an oil. The oil was recrystallized from 95% ethanol affording an additional 0.3 g. of the product.

Example 7.—2,3-dicarboxamido-3-isopropyl-1-indanone

A mixture of 8.7 g. of the product of Example 2 and 100 ml. of concentrated sulfuric acid was stirred at room temperature for 80 minutes and poured into 1 l. of ice water, yielding 7.7 g. (80%) of a white precipitate, M.P. 165–168°. Successive recrystallization from 95% ethanol, 30% ethanol and benzene-petroleum ether (3:1) afforded slightly pink crystals, M.P. 168.5–170°.

Example 8.—3a-isopropylsuccinimido[3,4-b]indan-8-one

A mixture of 6.5 g. of the product of Example 7, 50 ml. diethylene glycol and 1.2 ml. of concentrated sulfuric acid was heated at 120–130° for 30 minutes and poured into 600 ml. of ice water, yielding 5.2 g. (86%) of a yellowish precipitate, M.P. 232–236°. Two recrystallizations from 95% ethanol afforded colorless needles, M.P. 236–237°.

Example 9.—2,3-dicarboxamido-3-t-butyl-1-indanone

Addition of 1.0 g. of the product of Example 3 to 4 ml. of concentrated sulfuric acid, with stirring and the temperature maintained below 40° (5 minutes), gave a solution which looked like motor oil. The solution was stirred at room temperature for 30 minutes, poured into 40 ml. of ice water and the precipitate allowed to settle overnight, yielding 0.68 g. of an orange precipitate, M.P. 85–100° dec.; recrystallization from benzene-petroleum ether (3:1) afforded 0.23 g. (20%) of yellow crystals, M.P. 153–155° dec. Two further crystallizations from benzene-petroleum ether afforded colorless crystals, M.P. 157.5–158.5° (after melting, it bubbled, then resolidified and melted at 220–230°).

Example 10.—3a-t-butylsuccinimido[3,4-b]-indan-8-one

The aqueous filtrate of Example 9 upon sitting four days, afforded 0.38 g. (35%) of colorless crystals, M.P. 231–234°. Recrystallization from 50% ethanol afforded the product as colorless prisms, M.P. 243–244°.

Example 11.—3a-t-butylsuccinimido[3,4-b]-indan-8-one

A mixture of 1.0 g. of the product of example 3, 1 ml. of acetic acid and 2 ml. of concentrated sulfuric acid was heated at 120–140° for 15 minutes and poured into 20 g. of ice, yielding 0.87 g. of a yellow powder, M.P. 147–148°. Recrystallization from 50% ethanol afforded 0.20 g. (18%) of colorless prisms, M.P. 239–241°; with an infrared spectrum identical to that of the product of Example 10.

Alternatively, the method of Le Moal for converting cyano carboxamides to succinimides can be employed as follows:

A mixture of 1.0 g. of the product of Example 3 and 25 ml. of a solution containing 10% sulfuric acid, 70% acetic acid and 20% water was refluxed for one hour, poured into 250 ml. of ice water and bicarbonate added until the solution was basic. The basic solution was extracted with three 50-ml. portions of chloroform; the chloroform extract dried and evaporated, yielding 0.15 g. (14%) of the product as a colorless precipitate.

Example 12.—3a-t-butylsuccinimido[3,4-b]-indan-8-one

A mixture of 300 mg. of the product of Example 9, 5 ml. of diethylene glycol and 5 drops of concentrated sulfuric acid was heated at 120–130° for 15 minutes and poured into 50 ml. of ice and water, yielding 210 mg. of the product as a light green precipitate, M.P. 188–196°.

Example 13.—2,3-dicarboxamido-3-phenyl-1-indanone

A quantity of 20.0 g. of the product of Example 4 was added in portions to 80 ml. of concentrated sulfuric acid with stirring and the temperature maintained below 40°, by intermittent cooling in an ice bath. After the addition was complete (about 10 minutes), the mixture was stirred at room temperature for 1.5 hours, poured into 800 ml. of ice water with stirring and allowed to settle overnight, yielding 20.1 g. (95%) of pink microcrystals, M.P. 195–196°. Recrystallization from 95% ethanol gave orange-pink prisms, M.P. 195–196°.

Example 14.—3a-phenylsuccinimido[3,4-b]indan-8-one

To a slurry of 20.0 g. of the product of Example 13 and 150 ml. of diethylene glycol was added with stirring 5 ml. of concentrated sulfuric acid. The mixture was heated on a hot plate with stirring to 120° (a homogeneous violet solution was obtained at about 80°, which turned brown and finally yellow at about 110°), then heated at 120–130° for 15 minutes, poured into 2 l. of ice water and allowed to settle overnight, yielding 17.8 g. (94%) of a white precipitate, M.P. 176–178.5°. Recrystallization from 50% ethanol (about 500 ml.) gave 15.9 g. of the product as colorless needles, M.P. 180–181°.

Example 15

If the procedure of the foregoing examples is followed except for the use of substituted indenones, there are obtained the correspondingly substituted 3a-substituted succinimido[3,4-b]indan-8-ones as follows:

| No. | R | $R_1$ | Z | R | $R_1$ |
| --- | --- | --- | --- | --- | --- |
| 1 | $-C_2H_5$ | 6-Cl | $CONH_2$ | $-C_2H_5$ | 6-Cl |
| 2 | iso-$C_3H_7$ | 6-$CH_3O$ | $CONH_2$ | -iso-$C_3H_7$ | 6-$CH_3O$ |
| 3 | t-$C_4H_9$ | 5-$CF_3$ | CN | -t-$C_4H_9$ | 5-$CF_3$ |
| 4 | $C_6H_5$ | 6-$CH_3$ | $CONH_2$ | $-C_6H_5$ | 6-$CH_3$ |
| 5 | n-$C_3H_7$ | 6-$CH_3CO-$ | $CONH_2$ | -n-$C_3H_7$ | 6-$CH_3CO-$ |
| 6 | $C_2H_5$ | 6-$CH_3COO-$ | $CONH_2$ | $-C_2H_5$ | 6-$CH_3COO-$ |
| 7 | $CH_3$ | 6-F | $CONH_2$ | $-CH_3$ | 6-F |
| 8 | iso-$C_3H_7$ | 6-Br | $CONH_2$ | -iso-$C_3H_7$ | 6-Br |
| 9 | t-$C_4H_9$ | 6-$C_2H_5$ | CN | -t-$C_4H_9$ | 6-$C_2H_5$ |

Example 16.—Anorexic activity

In the mouse anorexia assay, the preferred compound of the present invention, succinimido[3,4-b]-3a-isopropyl-indan-8-one, was effective at 100, at 50 and at 25 mgm./kg. p.o. In this assay, groups of five mice not fed for the preceding 16–17 hours, are placed in a cage, given the drug to be tested, and after another thirty minutes, are given a weighed amount of food. One hour after presenting the food, the food dish is removed and weighed. Control mice, i.e. dosed with water, eat an average of 6.2 gm. per group of five mice. Significant anorexic activity is exhibited when a group of five treated mice eat less than 2 gm. in the hour. In various tests, the preferred compound of the present invention reduced the food intake to amounts in the range of 0–2 gm. at oral dosages of 25, 50 and 100 mgm./kg.

We claim:
1. A compound of the formula:

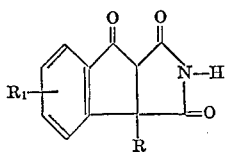

wherein R is lower alkyl of 1–8 carbons or phenyl, and $R_1$ is either hydrogen, halogen, trifluoromethyl, lower alkyl, lower alkoxy, lower alkanoyl or lower alkanoyloxy; or a pharmaceutically acceptable metal salt of said compound.

2. The compound of

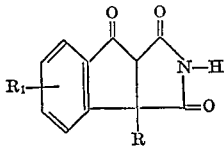

wherein R is ethyl and $R_1$ is hydrogen.

3. The compound of

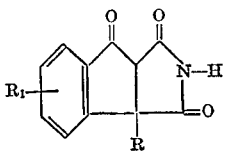

wherein R is isopropyl and $R_1$ is hydrogen.

4. The compound of

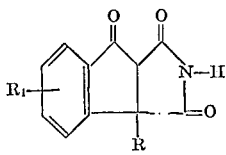

wherein R is t-butyl and $R_1$ is hydrogen.

5. The compound of

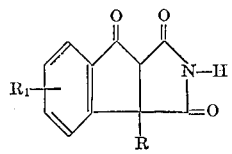

wherein R is phenyl and $R_1$ is hydrogen.

6. A process of preparing a compound of the formula:

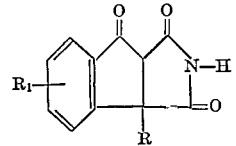

wherein R is lower alkyl of 1–8 carbons or phenyl, and $R_1$ is either hydrogen, halogen, trifluoromethyl, lower alkyl, lower alkoxy, lower alkanoyl or lower alkanoyloxy; which comprises:
(a) treating a 2-carboxamido- or 2-cyano-3-R-1-indenone with a cyanide in an acidic alcoholic medium to thereby add cyanide at the 3-position and give the corresponding 2-carboxamido- or 2-cyano-3-cyano-3-R-1-indanone;
(b) hydrolyzing the 2-carboxamido- or 2-cyano-3-cyano-3-R-1-indanone to give the corresponding 2,3-dicarboxamido-3-R-1-indanone; and
(c) ring-closing the 2,3-dicarboxamido-3-R-1-indanone with an acid at an elevated temperature and recovering the desired product from the reaction mixture.

References Cited
FOREIGN PATENTS
787,061  11/1957  Great Britain.

OTHER REFERENCES

Dey et al.: Indian Journal of Chemistry, vol. 2, pages 371–2 (1964). QD1, I65.

Weddleton Dissertation Abstracts, vol. 26, page 2488 (November 1965). AS30.M5.

HENRY R. JILES, *Primary Examiner.*

N. TROUSOF, *Assistant Examiner.*

U.S. Cl. X.R.

260—326.3, 448, 465, 488, 558, 559, 694, 999